United States Patent [19]

Kuramatsu

[11] Patent Number: 5,440,298
[45] Date of Patent: Aug. 8, 1995

[54] PAGING RECEIVER HAVING DATA RATE DETECTOR FOR CONTINUING ADDRESS RECEIVING MODE

[75] Inventor: Hiroyasu Kuramatsu, Tokyo, Japan
[73] Assignee: NEC Corporation, Tokyo, Japan
[21] Appl. No.: 52,034
[22] Filed: Apr. 20, 1993

[30] Foreign Application Priority Data

Apr. 20, 1992 [JP] Japan .................................. 4-099078
Apr. 27, 1992 [JP] Japan .................................. 4-107181

[51] Int. Cl.⁶ .............................................. H04Q 7/00
[52] U.S. Cl. ................................ 340/825.44; 455/38.3
[58] Field of Search ....................... 340/825.44, 825.47, 340/825.48; 455/343, 38.3, 38.5

[56] References Cited

U.S. PATENT DOCUMENTS

| | | | |
|---|---|---|---|
| 4,663,623 | 5/1987 | Lax et al. | 340/825.44 |
| 4,768,032 | 8/1988 | Sharpe et al. | 340/825.48 |
| 4,839,639 | 6/1989 | Sato et al. | 340/825.44 |
| 5,144,296 | 9/1992 | DeLuca et al. | 340/825.44 |
| 5,181,227 | 1/1993 | DeLuca et al. | 455/343 |
| 5,241,568 | 8/1993 | Fernandez et al. | 455/343 |
| 5,257,019 | 10/1993 | Schwendeman et al. | 340/825.47 |

FOREIGN PATENT DOCUMENTS 212422  3/1990  Japan .............................. H04B 7/26

*Primary Examiner*—Donald J. Yusko
*Assistant Examiner*—Edward Merz
*Attorney, Agent, or Firm*—Sughrue, Mion, Zinn, Macpeak & Seas

[57] ABSTRACT

In an address receiving mode of a paging receiver, an address codeword contained in each successive batch of a paging signal is compared with the address of the receiver to detect a match. The bit rate of data pulses generated by the receiving section are checked to see if it is in a prescribed range of bit rates. If the receiver fails to detect an address match in one of the batches due to fading, it continuously receives the address codewords in successive batches, rather than returning to standby mode, if the bit rate of the data pulse is determined to be in the prescribed range.

6 Claims, 6 Drawing Sheets

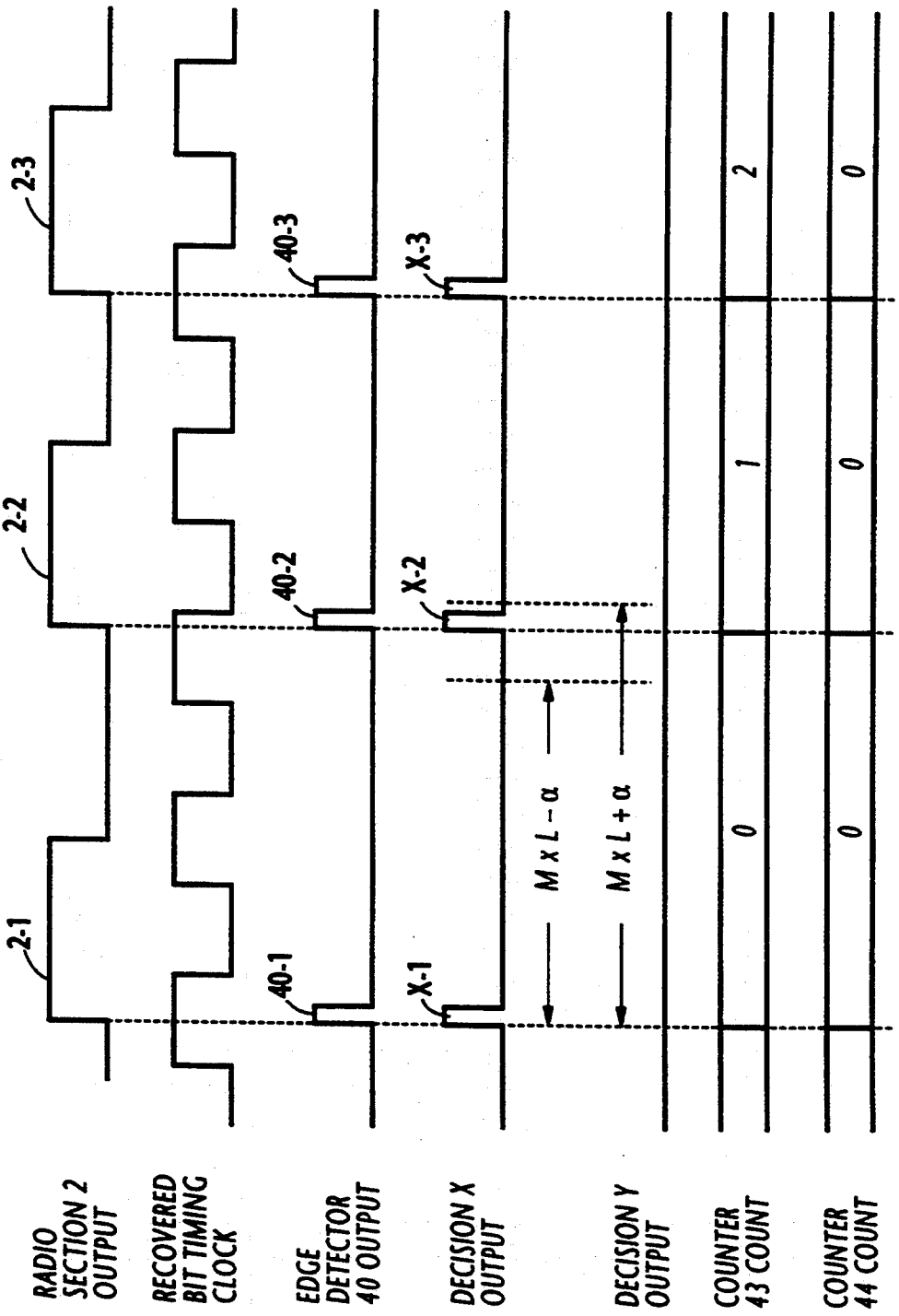

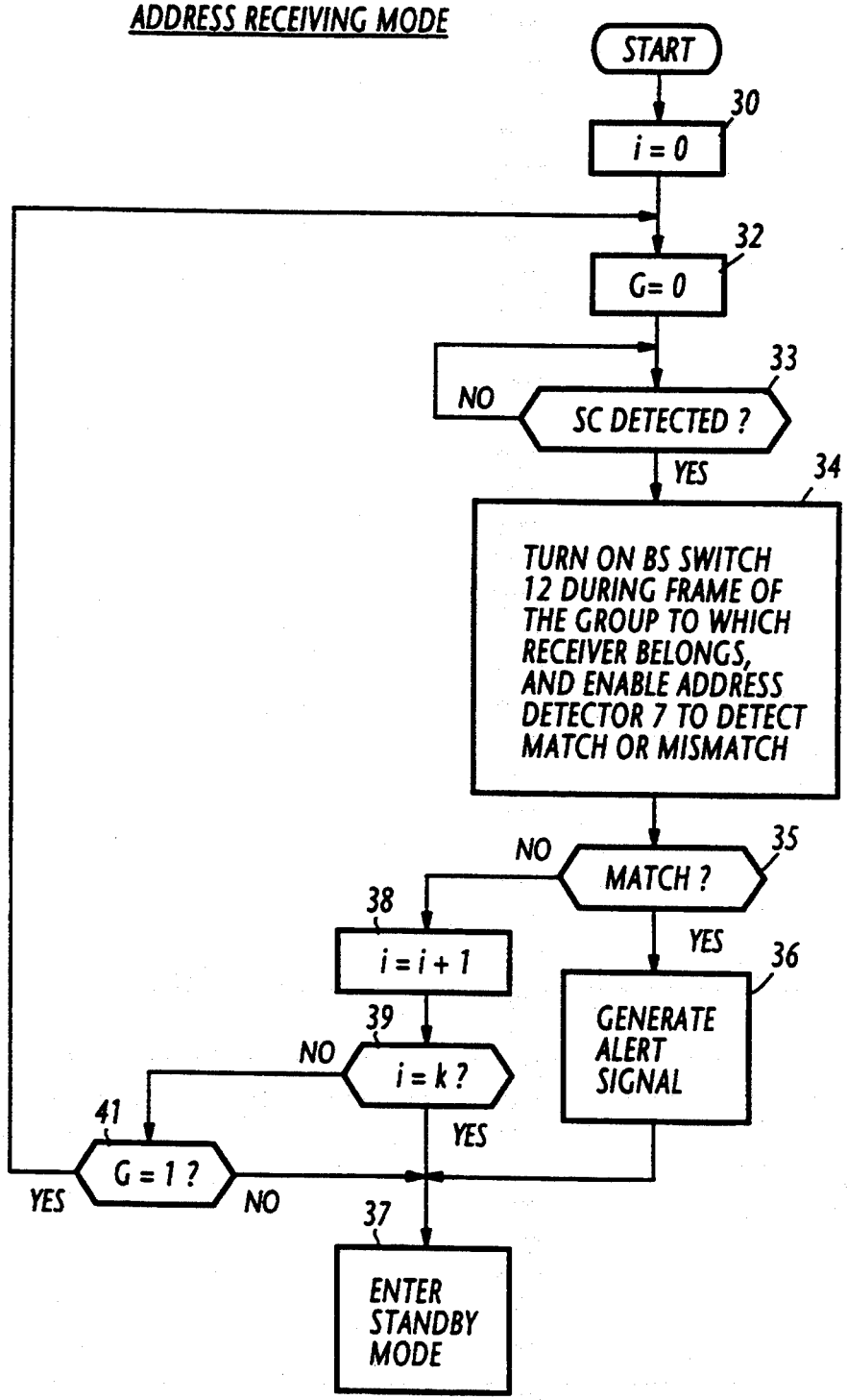

PAGING RECEIVER HAVING DATA RATE DETECTOR FOR CONTINUING ADDRESS RECEIVING MODE

BACKGROUND OF THE INVENTION

1. Field of the Invention

The present invention relates generally to radio paging receivers, and more specifically to a battery saving technique for a paging receiver which suffers from disturbances such as fading.

2. Description of the Related Art

Battery saving is an important Mature for hand-held paging receivers in order to keep the battery consumption to a minimum. As described In U.S. Pat. No. 4,839,639, T. Sato et al., a battery saving circuit reduces battery usage by powering the radio section of the receiver when it is in a standby mode at intervals sufficient to receive a preamble of a paging signal that is followed by a series of batches each including a synchronization codeword and a plurality of frames each comprising an address codeword and a message codeword. Each pager is associated with one of the frames to seek the codewords of the associated frame of each batch. On receiving the preamble, the receiver establishes a bit timing synchronization and then enters an address receiving mode during which the radio section is powered at such intervals that the address codeword and a message codeword can be received in each batch. However, If fading should occur in one of the batches, the receiver will fall to detect an address codeword in successive batches and returns to the standby mode, recognizing that the received page is not directed to the receiver. Therefore, the prior art receiver must wait for the next paging signal when the incoming signal is disturbed by fading during the address receiving mode.

Japanese patent 90-12422 discloses a paging receiver having a phase-locked loop bit rate detector for establishing a bit timing synchronization with a preamble and simultaneously detecting the arrival of the preamble. The bit rate detector includes an edge detector for producing a transition pulse in response to each of the leading and trailing edges of a data pulse from the receiving section. The transition pulses are compared by a phase comparator with an output signal from a frequency divider to produce a phase difference signal, which is then applied through an integrator to a pulse insertion/depletion circuit to which a local clock is applied. The frequency divider receives the output of the pulse insertion/depletion circuit to constitute a phase lock loop. The transition pulse is also applied to a latch whose output is coupled to the up-count Input of a counter. A window pulse generator Is responsive to the output of frequency divider for feeding a reference or window pulse, to the down-count input of the counter and to the reset terminal of the latch. When the transition pulse coincides with the window pulse, the latch produces a coincidence output to increment the counter, otherwise the counter is decremented by the window pulse. In the absence of a signal, noise is randomly generated and the duty ratio of the data pulses deviates randomly from the nominal 50% value, causing the transition pulses to be displaced from the window pulses. As a result, the inputs of the counter are cancelled out. The counter output is applied to comparators for comparison with threshold values. Different patterns of battery saving are effected in accordance with the results of the comparisons.

SUMMARY OF THE INVENTION

It is therefore an object of the present Invention to provide a paging receiver capable of continuously activating the receiver in an address receiving mode even if an address codeword is disturbed by fading during a batch to allow detection of an address codeword contained in a subsequent batch.

According to a first aspect, the receiver of the present invention comprises a receiver means for receiving a paging signal containing a preamble signal and a series of batches each including a synchronization word and a plurality of frames each containing a respective address codeword, and producing data pulses. A transition detector is provided for producing a transition pulse in response to only one of the leading and trailing edges of each data pulse. Clock timing pulses are recovered from the data pulses and reference pulses of fixed duration are derived from the clock timing pulses. A coincidence detector detects a coincidence between each transition pulse and each reference pulse. A counter counts the coincidence and generates an output signal indicating that the paging signal is being correctly received when the number of coincidences exceeds a threshold value. Detector circuits are provided for detecting a preamble signal, a synchronization word and an address codeword. During a standby mode, a power controller periodically activates the receiver means to allow the preamble detector to detect a preamble signal. Upon detection of the preamble signal, the power controller activates the receiver means to allow the synchronization word to be detected, and upon detection of the synchronization word it activates the receiver means to allow an address word to be detected in the associated frame. In response to the detection of the address codeword, the controller generates an alert signal to indicate the arrival of a call. If the counter produces an output signal at the same time the address word is not detected in the associated frame, the power controller activates the receiver means to allow an address word to be detected in the associated frame of a subsequent batch.

According to a second aspect of the present invention, the paging receiver comprises an interval detector for detecting the interval between successive transition pulses. A decision circuit determines when the detected interval is within a predetermined range and produces a coincidence signal. The counter counts the coincidence signal and generates an output signal indicating that the paging signal is being correctly received when the number of coincidences exceeds a threshold value.

BRIEF DESCRIPTION OF THE DRAWINGS

The present invention will be described in further detail with reference to the accompanying drawings, in which:

FIG. 5 is a timing diagram representative of the operation of the controller of the second embodiment;

FIG. 6 is a flowchart representative of the operation of a modified embodiment.

DETAILED DESCRIPTION

Paging signals for use in the present invention include the POCSAG code as proposed by the British Post Office, which consists of a preamble signal and a number of batches which follow the preamble signal. One batch is made up of a single synchronization codeword (SC) and eight frames each consisting of two codewords and adapted for the transmission of an address codeword or a message codeword. Paging receivers are divided into eight groups corresponding respectively to the eight frames of each batch in order to process only the codewords of the corresponding frame. A paging receiver which belongs to the second group, for example, does not receive and process address codewords except for that one which is contained in the second frames.

Figure 1:
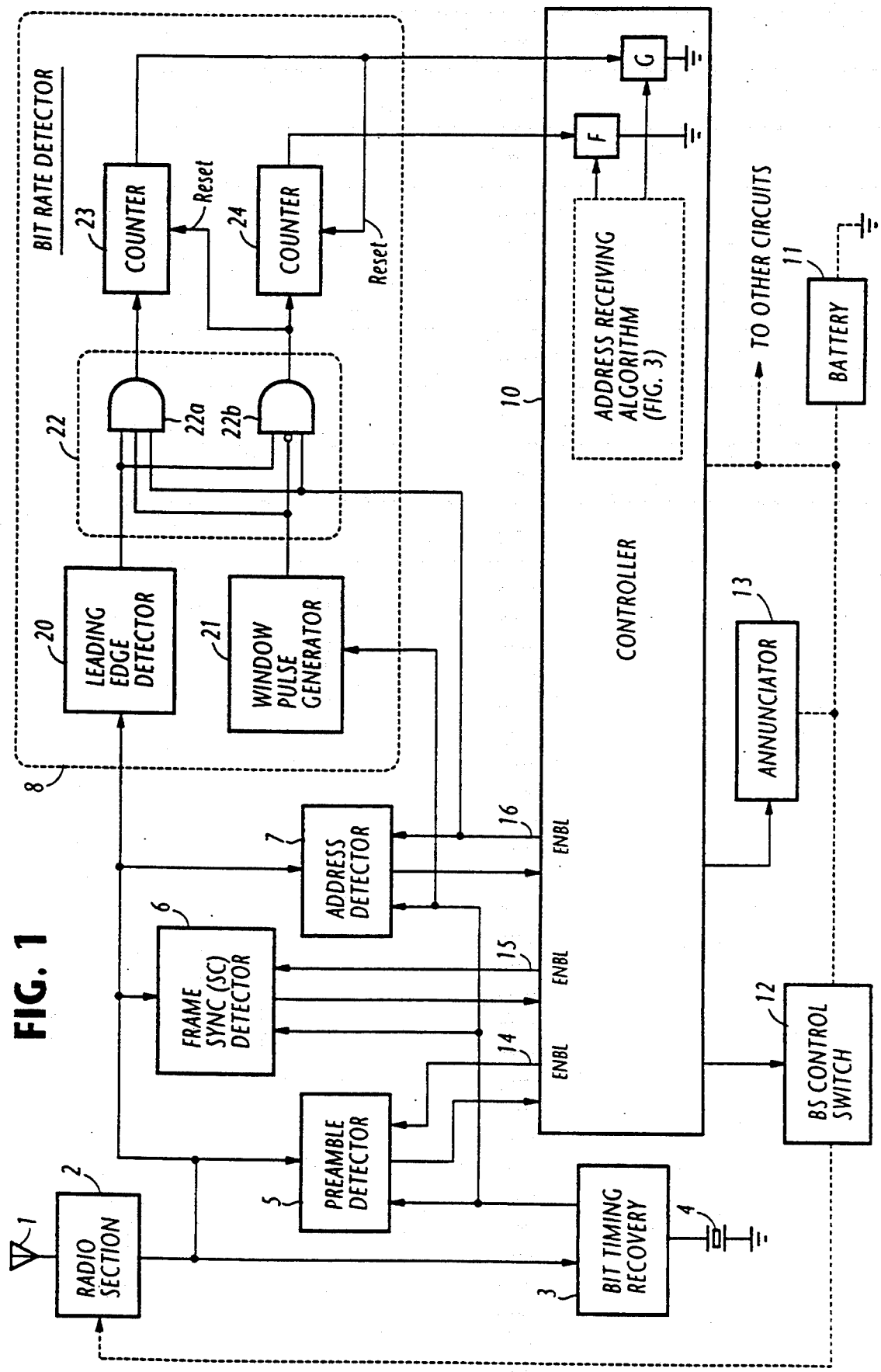
FIG. 1 is a block diagram of a radio paging receiver according to a first embodiment of the present invention.

Referring to FIG. 1, a paging signal detected by an antenna 1 is fed to a radio section 2 which amplifies the received signal, converts its frequency, and demodulates it to produce a baseband data signal. The demodulated signal is converted into a rectangular wave having a nominal 50% duty ratio. The output of radio section 2 is then applied to a bit timing recovery circuit 3 to which a reference clock is supplied from a crystal oscillator 4. The bit timing recovery circuit 3 feeds a recovered clock to various sections of the pager by timing the recovered clock to the output signal of the radio section 2. The output of bit timing recovery circuit 3 is supplied to a preamble detector 5, a frame sync (SC) detector 6 and an address detector 7 to which the baseband signal is also coupled from the radio section 2. The outputs of the detectors 5, 6 and 7 are coupled to a controller 10 which processes the input signals and produces enable signals via lines 14, 15, 16 for subsequent signal detection phase of the paging signal. Additionally, controller 10 makes a decision on whether the received signal is out of timing with the standard bit rate established by the paging system.

A bit rate detector 8 is provided to monitor the bit rate of the incoming signal and generates a first or a second bit rate signal to the controller 10 after bit synchronization has been established. The first bit rate signal indicates that a signal is being received at a bit rate which does not match the bit rate which the receiver is expecting to receive after bit synchronism has been established. Such bit rate mismatching can occur when the incoming signal is affected by fading or by noise or absence of signals. The second bit rate signal indicates that there is a signal that is being received at a bit rate that matches the expected bit rate, signifying that the incoming signal is a paging signal.

The radio section 2 is powered via a battery saving switch 12 which is controlled by controller 10, while the offer circuits of the receiver are continuously powered by a battery 11. As described in detail in U.S. Pat. No. 4,839,639, T. Sato et al, controller 10 feeds a battery saving control signal to the BS control switch 12 during a standby mode, so that the radio section 2 is intermittently powered and the preamble detector 5 is allowed to search for a preamble signal which is a repetition of 1's and 0's. Within the period of this preamble signal, the receiver enters a sync setup mode to establish bit timing synchronism.

The preamble detector 5 monitors the recovered bit timing clock and feeds a preamble detect signal to the controller 10 when it has detected a preamble signal. In response to the preamble detect signal, controller 10 applies a first battery saving (BS) pulse to the BS control switch 12 to continuously power the radio section 2 to allow the bit timing recovery circuit 3 to establish bit synchronization by recovering the transmitted clock. At the same time, controller enables the frame sync detector 6 to allow it to search for the synchronization codeword (SC) of the first batch that immediately follows the preamble signal. Upon detection of the sync codeword of the first batch by the frame sync detector 6, the paging receiver enters an address receiving mode. The controller 10 now turns off the radio section 2, uses the detected sync codeword as the start timing of the first batch to determine the particular frame (second frame) of the receiver and turns on the radio section 2 for the duration of two codewords, while at the same time enabling the address detector 7 to search for an address codeword which may be contained in the second frame.

The address detector 7 supplies an address detect signal to controller 10 if the received address codeword is identical to the address of the receiver. Controller 10, in response, applies an alert signal to an annunciator 13, whereby the annunciator produces an alert tone.

As illustrated, the bit rate detector 8 comprises a leading edge detector 20 and a window pulse generator 21. The leading edge detector 20 receives the baseband output of radio section 2 and produces a short-duration transition pulse in response to the leading edge transition of each rectangular pulse of the baseband signal. The window pulse generator 21 receives the output of bit timing recovery circuit 3 to generate a window pulse (reference pulse) of fixed duration greater than the duration of the transition pulse. Window pulses are synchronized with the bit timing clock pulses such that the center of duration of each window pulse coincides with the leading edge of each bit timing clock pulse, so that when the receiver is in sync with the incoming signal, the leading edge of alternate rectangular pulses from radio section 2 coincides with the center of duration of alternate window pulses.

The outputs of leading edge detector 20 and window pulse generator 21 are supplied to a gate circuit 22 which is enabled by the same enable signal as that supplied to the address detector 7. The gate circuit 22 is comprised of AND gates 22a and 22b. AND gate 22a allows passage of the transition pulse to the count input of a counter 23 if it coincides with one of the window pulses, and AND gate 22b allows passage of the transition pulse to the reset input of counter 23 and the count input of a counter 24 if it occurs during the interval between any successive ones of the window pulses. The output of AND gate 22a is indicative of a situation that it is likely that a paging signal is being received at the standard bit rate, while the output of AND gate 22b is indicative of a situation that the bit rate of the paging signal is likely to be deviating from the standard bit rate.

The output of AND gate 22a drives the counter 23 to increment its count value. If there is an uninterrupted, long sequence of output pulses from gate 22a, the value of counter 23 will be incremented to a predetermined value before the counter 23 is reset by the output of AND gate 22b. When this occurs, counter 23 feeds the second bit rate signal to controller 10 to set a "1" into a flag (flip-flop) G. On the other hand, the output of AND gate 22b drives the counter 24 to increment its count. When counter 24 is driven by a predetermined number of pulses from AND gate 22b, it feeds the first bit rate signal to controller 10 to set a "1" into a flag F. Counter 24 is reset by the second bit rate signal.

Figure 2:
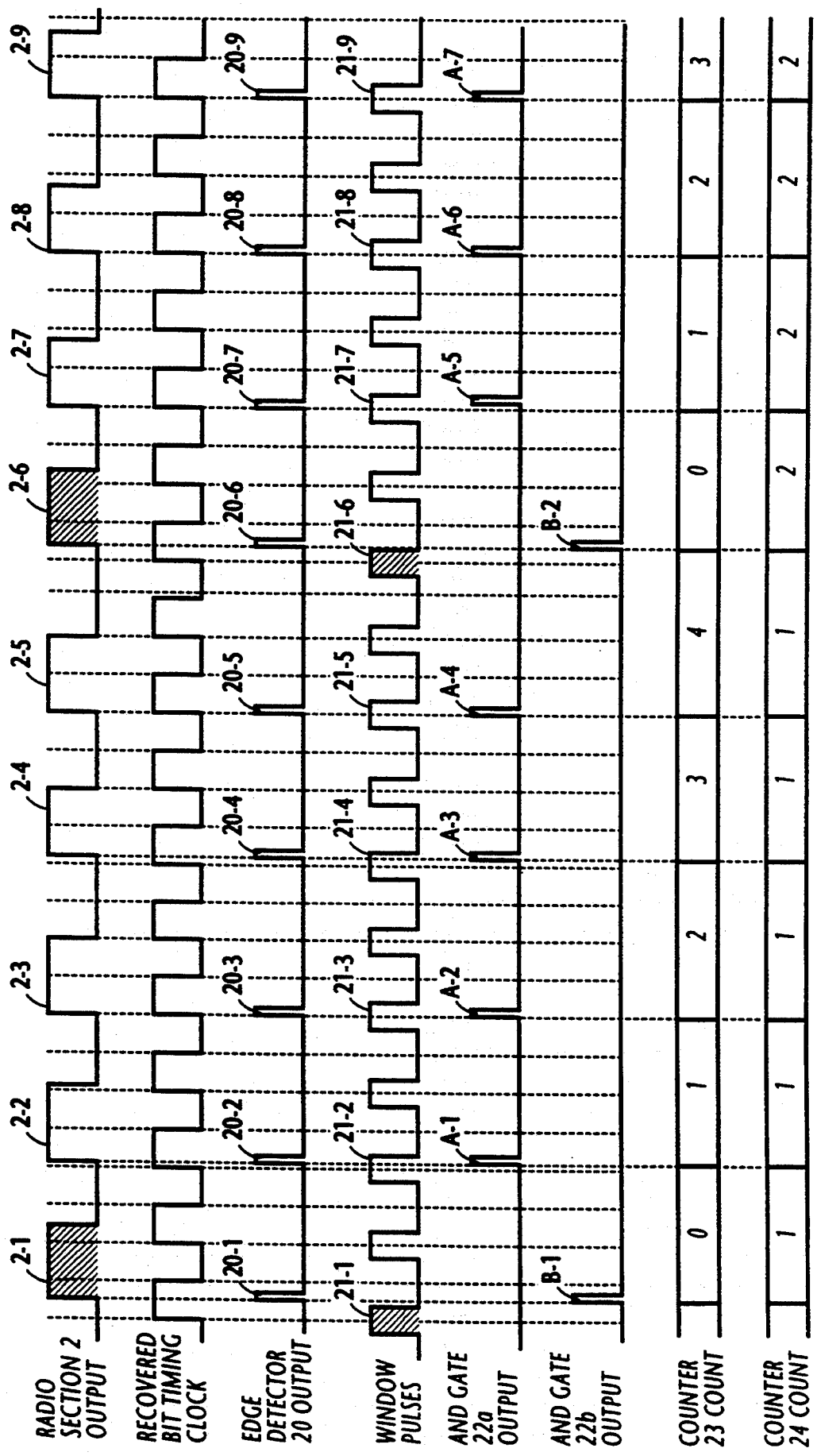
FIG. 2 is a timing diagram representative of the operation of the controller of the first embodiment.

The operation of the bit rate detector 8 when enabled during an address receiving mode will be better understood with reference to a timing diagram shown in FIG. 2. The duty ratio of the rectangular data pulses generated by radio section 2 when it is turned on during the particular frame of the receiver may deviate from the nominal 50% value and such deviation/may vary from one instant to another as illustrated in FIG. 2. When bit timing is established during the reception of a preamble signal, a sequence of clock pulses of 50% duty is continuously generated by bit timing recovery circuit 3 at twice the frequency of data pulses from radio section 2.

Assume that data pulses 2-1–2-9 are generated in sequence by radio section 2 with the pulses 2-1–2-6 having the 50% duty ratio and the pulses 2-7∼2-9 having a less-than-50% duty ratio. The leading edge of each of pulses 2-1 and 2-6 lags behind the center of duration of corresponding window pulses 21-1 and 21-6 by more than half the window pulse duration, while the leading edge of each of the other pulses coincides with, or lags behind, the center of duration of the corresponding window pulse by less than half the window pulse duration.

Thus, a transition pulse 20-1 generated in response to data pulse 2-1 by leading edge detector 20 occurs outside of the duration of window pulse 21-1, resulting in a pulse B-1 at the output of AND gate 22b which drives counter 24 to increment its count value to one. Transition pulses 20-2∼20-5, which are generated in response to data pulses 2-2∼2-5, respectively coincide with window pulses 21-2∼21-5, resulting in pulses A-1∼A-4 at the output of AND gate 22a which drive counter 23 to increment its value from 0 to 4. Transition pulse 20-6 corresponding to data pulse 2-6 occurs outside of the duration of a corresponding window pulse 21-6, thus feeding a pulse B-2 to counter 24 to increment it to 2, while resetting the counter 23 to 0. While data pulses 2-7∼2-9 have a less-than-50% duty ratio, their leading edges respectively coincide with the center of duration of window pulse 21-7∼21-9, and pulses A-5∼A7 are therefore output from gate 22a to counter 23 to cause it to increment its value from 0 to 3. It is seen that as long as the leading edge of each data pulse coincides with a window pulse an uninterrupted sequence of pulses will be produced by AND gate 22a even though the duty ratio of the data pulse may deviate from the nominal value.

Figure 3:
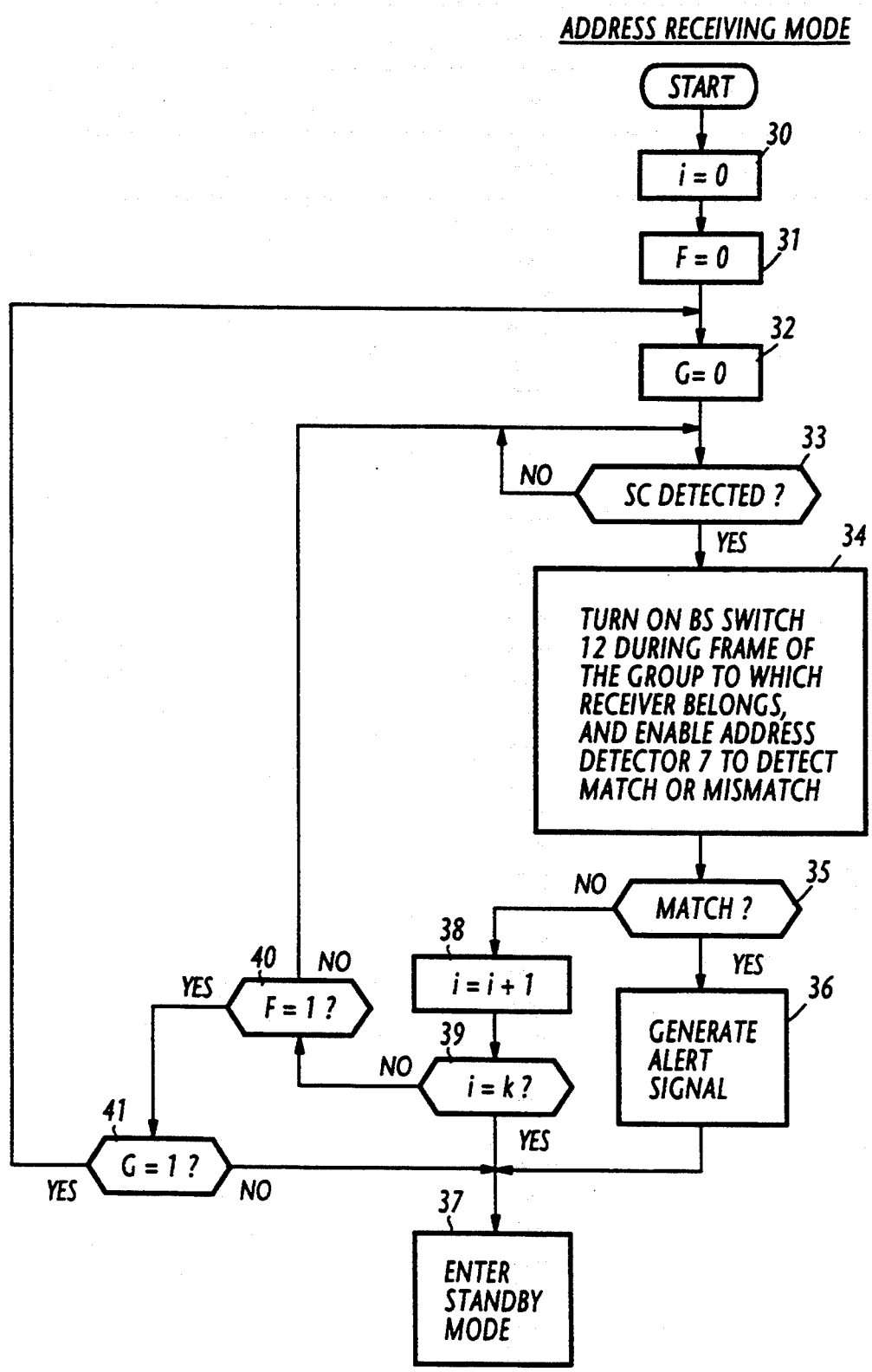
FIG. 3 is a flowchart representative of the operation of a controller.

The operation of the controller 10 during an address receiving mode will be better understood with reference to a flowchart shown in FIG. 3 in which programmed instructions to be performed by the controller 10 during an address receiving mode are illustrated. In response to a preamble detect signal from the preamble detector 5, program execution starts with block 30 to initialize variable i to 0. Exit then is to block 31 to reset flag F to zero and then to block 32 to reset flag G to zero. Control proceeds to decision block 33 to detect a synchronization codeword (SC). If controller 10 receives an SC detect signal from frame sync detector 6, control branches to block 34 to turn on the BS control switch 12 to power the radio section 2 during the frame of the group to which the receiver belongs, and enables the address detector 7 to allow it to detect a match or mismatch between a received address codeword and the address codeword of the receiver. Control proceeds to block 35 to determine whether the address detector 7 produces an address detect signal. If the answer is affirmative, control branches to block 36 to generate an alert signal to alert the bearer of the receiver with an alert tone and then proceeds to block 37 to enter a standby mode.

If the answer is negative at block 35, control branches to block 38 to increment the variable i by one, and advances to block 39 to check to see if variable i is equal to a prescribed integer k. If the answer is affirmative, control branches to block 37 to enter the standby mode, recognizing that the received address codeword is not identical to the address of the receiver.

If the answer is negative at decision block 39, control branches to block 40 and checks to see if flag F has been set to 1 by the bit rate detector 8. If the answer is negative, control returns to block 33 to repeat the process, and if the answer is affirmative (i. e., the received signal is out of the required bit rate range), control recognizes that the incoming signal has been disturbed by fading and branches at block 40 to block 41 to determine whether flag G has been set to 1. If the decision is negative, control exits to block 37 to allow the receiver to enter the standby mode. If the decision is affirmative at block 41, control returns to block 32 to continue the address receiving mode to prepare for the reception of a subsequent synchronization codeword and an address codeword that follows.

It is seen therefore that if a certain batch of a received signal is affected by fading during an address receiving mode and the receiver fails to detect its address codeword, the receiver is allowed to continue the address receiving mode to receive its address codeword in the next patch, rather than entering a standby mode, thus eliminating the need to wait for the next preamble to establish synchronization for detecting an address codeword.

If fading should occur during an address receiving mode and bit synchronization is lost, there is a substantial speed difference between data pulses and bit timing clock pulses during the initial period of bit timing recovering process. Since the recovered bit clock timing is used In the process of bit rate detection, the transition pulse would not coincide with window pulses even if the incoming signal is received at the standard bit rate, preventing the bit rate detector 8 from supplying the second bit rate signal until bit synchronization is established.

Figure 4:
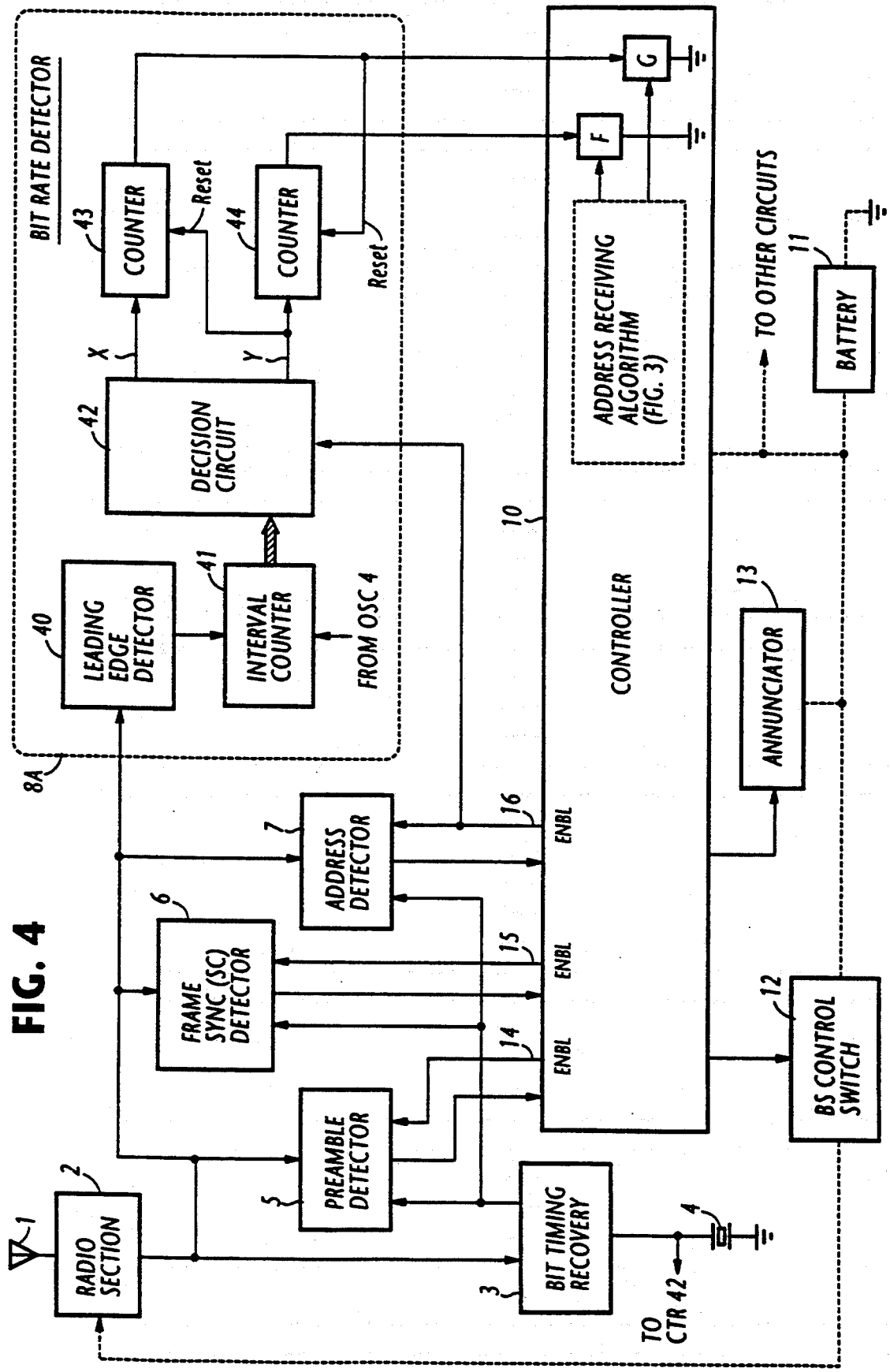
FIG. 4 is a block diagram of a radio paging receiver according to a second embodiment of the present invention.

To overcome this delayed response of the bit rate detector, a modified form of the bit rate detector is shown at 8A in FIG. 4. In this modification, bit rate detector 8A comprises a leading edge detector 40, an interval counter 41, a decision circuit 42 and counters 43 and 44. Similar to the previous embodiment, leading edge detector 40 produces a transition pulse in response to the leading edge of each data pulse from radio section 2. The interval counter 41 responds to a transition pulse from leading edge detector 40 by counting local clock pulses from crystal oscillator 4 to increment a count value and resets the count value in response to the next transition pulse and feeds the final count value to the decision circuit 42 as an indication of the length of interval between the leading edges of successive data pulses, while restarting the count operation to measure the next data pulse interval. When enabled by the controller 10, decision circuit 42 compares the output of interval counter 41 with a range of reference values and provides a first decision output on lead X to the count input of counter 43 when the length of pulse interval lies within the reference range or a second decision output on lead Y to the count input of counter 44 when it is outside the reference range. Specifically, the reference range is given by the relation $M \times L \pm \alpha$, where M is an Integer including unity, L is the bit length of the transmitted signal, and $\alpha$ is an allowance value determined by the particular operating characteristics of the radio section.

The output signal on lead Y Is also applied to the reset input of counter 43. Counters 43 and 44 apply a second bit rate signal and a first bit rate signal to the controller 10 to set a "1" into flags G and F, respectively, in a manner Identical to the counters 23 and 24 of the previous embodiment.

As shown in FIG. 5, if the leading edge of each data pulse is within the range $M \times L \pm \alpha$, leading edge detector 40 produces output pulse 40-1, 40-2, 40-3 in response to the leading edges of data pulses 2-1, 2-2 2-3, decision circuit 42 produces corresponding output pulses X-1, X-2 and X-3 totally independently of the recovered bit clock timing.

Since the bit timing recovery circuit 3 is not involved in the bit rate detection process, the bit rate detector 8A is able to supply the second bit rate signal instantly when the transmission speed of data pulse is found to match the standard bit rate.

While mention has been made of embodiments in which the first bit rate signal is used as an indication that the bit rate of data pulses deviates from the standard bit rate, this signal may be dispensed with by using the absence of the second bit rate signal to give such indications. In this case, the flowchart of FIG. 3 can be modified as shown in FIG. 6 by deleting blocks 31 and 40 of FIG. 3 and having control enter decision block 41 immediately following the negative decision at block 39.

The foregoing description shows only preferred embodiments of the present invention. Various modifications are apparent to those skilled in the art without departing from the scope of the present invention which is only limited by the appended claims.

What is claimed is:

1. A receiver of a paging system which transmits a paging signal containing a preamble signal and a series of batches each including a synchronization word and a plurality of frames each containing a respective address codeword, the receiver being associated with one of said frames, comprising:

receiver means for receiving said paging signal and producing therefrom data pulses;

transition detecting means for producing a transition pulse in response to only one of leading and trailing edges of each of said data pulses;

clock timing recovery means for recovering clock pulses from said data pulses;

means for deriving a reference pulse of fixed duration from said clock pulses;

coincidence detecting means for detecting a coincidence between said transition pulse and said reference pulse;

first counter means for counting the detected coincidence to produce a count and generating an output signal indicating that said paging signal is being correctly received when the count exceeds a threshold;

preamble detecting means for detecting a preamble signal contained in said data pulses;

synchronization word detecting means for detecting a synchronization word contained in said data pulses;

address word detecting means for detecting an address codeword in the associated frame; and power control means for periodically activating said receiver means to allow said preamble detecting means to detect a preamble signal, responsive to the detection of the preamble signal by said preamble detecting means for activating said receiver means to allow said synchronization word detecting means to detect a synchronization word, responsive to the detection of the synchronization word by said synchronization word detecting means for activating said receiver means to allow said address word detecting means to detect an address codeword, responsive to the detection of an address codeword by said address word detecting means for generating an alert signal, and responsive to an output signal of said counter means, which is generated at the same time said address word detecting means fails to detect an address codeword in said associated frame, for activating said receiver means to allow said address word detecting means to detect an address codeword in the associated frame of a subsequent batch.

2. A receiver as claimed in claim 1, further comprising non-coincidence detecting means for detecting a non-coincidence between said transition pulse and said reference pulse, and second counter means for counting said non-coincidence to produce a second count and resetting the count of said first counter means to zero when the second count exceeds a second threshold.

3. A receiver of a paging system which transmits a paging signal containing a preamble signal and a series of batches each including a synchronization word and a plurality of frames each containing a respective address codeword, the receiver being associated with one of said frames, comprising:

receiver means for receiving said paging signal and producing therefrom data pulses;

transition detecting means for producing a transition pulse in response to only one of leading and trailing edges of each of said data pulses;

means for detecting an interval between successive ones of said transition pulse decision means detecting when the detected interval is within a predetermined range and producing a coincidence signal;

first counter means for counting said coincidence signal to produce a count and generating an output signal indicating that said paging signal is being correctly received when the count exceeds a threshold;

preamble detecting means for detecting a preamble signal contained in said data pulses;

synchronization word detecting means for detecting a synchronization word contained in said data pulses;

address word detecting means for detecting an address codeword in the associated frame;

power control means for periodically activating said receiver means to allow said preamble detecting means to detect a preamble signal, responsive to the detection of the preamble signal by said preamble detecting means for activating said receiver means to allow said synchronization word detecting means to detect a synchronization word, responsive to the detection of the synchronization word by said synchronization word detecting means for activating said receiver means to allow said address word detecting means to detect an address codeword, responsive to the detection of an address codeword by said address word detecting means for generating an alert signal, and responsive to an output signal of said counter means, which is generated at the same time said address word detecting means fails to detect an address codeword in said associated frame, for activating said receiver means to allow said address word detecting means to detect an address codeword in the associated frame of a subsequent batch.

4. A receiver as claimed in claim 3, further comprising non-coincidence detecting means for producing a non-coincidence signal when the interval between successive ones of said transition pulse is outside said predetermined range and second counter means for counting said non-coincidence signal to produce a second count and resetting the count of the first counter means to zero when the second count exceeds a second threshold.

5. In a receiver for a paging system which transmits a paging signal containing a preamble signal and a series of batches each including a synchronization word and a plurality of frames each containing a respective address codeword, the receiver being associated with one of said frames, wherein the receiver comprises receiver means for receiving said paging signal and producing therefrom data pulses, transition detecting means for producing a transition pulse in response to only one of leading and trailing edges of each of said data pulses, clock timing recovery means for recovering clock pulses from said data pulses, means for deriving a reference pulse of fixed duration from said clock pulses, coincidence detecting means for detecting a coincidence between said transition pulse and said reference pulse, and counter means for counting said coincidence to produce a count and generating an output signal indicating that said paging signal is being correctly received when the count exceeds a threshold, a method comprising the steps of:

a) periodically activating said receiver means and detecting said preamble signal;

b) activating said receiver means if a preamble signal is detected by the step (a) and detecting said synchronization word;

c) activating said receiver means if a synchronization word is detected by the step (b) and detecting an address codeword in the associated frame of one of said batches;

d) if an address codeword is detected by the step (c), generating an alert signal;

e) if an address codeword is not detected by the step (c) and if said output signal is generated by said counter means, activating said receiver means and repeating the steps (c) and (d); and f) if said output signal is not generated by said counter means, repeating the steps (a) to (e).

6. In a receiver for a paging system which transmits a paging signal containing a preamble signal and a series of batches each including a synchronization word and a plurality of frames each containing a respective address codeword, the receiver being associated with one of said frames, wherein the receiver comprises receiver means for receiving said paging signal and producing therefrom data pulses, transition detecting means for producing a transition pulse in response to only one of leading and trailing edges of each of said data pulses, decision means for detecting an interval between successive ones of said transition pulse and producing a coincidence signal when the detected interval is within a predetermined range, and counter means for counting said coincidence signal to produce a count and generating an output signal indicating that said paging signal is being correctly received when the count exceeds a threshold, a method comprising the steps of:

a) periodically activating said receiver means and detecting said preamble signal;

b) activating said receiver means if a preamble signal is detected by the step (a) and detecting said synchronization word;

c) activating said receiver means if a synchronization word is detected by the step (b) and detecting an address codeword in the associated frame of one of said batches;

d) if an address codeword is detected by the step (c), generating an alert signal;

e) if an address codeword is not detected by the step (c) and if said output signal is generated by said counter means, activating said receiver means and repeating the steps (c) and (d); and f) if said output signal is not generated by said counter means, repeating the steps (a) to (e).

* * * * *

UNITED STATES PATENT AND TRADEMARK OFFICE
CERTIFICATE OF CORRECTION

PATENT NO.   : 5,440,298
DATED        : August 8, 1995
INVENTOR(S)  : Hiroyasu KURAMATSU It is certified that error(s) appears in the above-identified patent and that said Letters Patent is hereby corrected as shown below:

Col. 1, line 14, delete "Mature" and insert --feature--.

Col. 1, line 32, delete "fall" and insert --fail--.

Col. 3, line 30, delete "4" and insert --5--.

Signed and Sealed this

Sixteenth Day of January, 1996

Attest:

BRUCE LEHMAN

*Attesting Officer*  *Commissioner of Patents and Trademarks*